United States Patent
Fortmann et al.

(10) Patent No.: US 7,741,728 B2
(45) Date of Patent: Jun. 22, 2010

(54) WIND POWER PLANT COMPRISING A REACTIVE POWER MODULE FOR SUPPORTING A POWER SUPPLY SYSTEM AND CORRESPONDING METHOD

(75) Inventors: Jens Fortmann, Berlin (DE); Heinz-Hermann Letas, Gross Meinsdorf (DE)

(73) Assignee: Repower Systems AG, Hamburg (DE)

( * ) Notice: Subject to any disclaimer, the term of this patent is extended or adjusted under 35 U.S.C. 154(b) by 452 days.

(21) Appl. No.: 10/573,294

(22) PCT Filed: Sep. 27, 2004

(86) PCT No.: PCT/EP2004/010816

§ 371 (c)(1),
(2), (4) Date: Jun. 3, 2008

(87) PCT Pub. No.: WO2005/031160

PCT Pub. Date: Apr. 7, 2005

(65) Prior Publication Data

US 2008/0252076 A1    Oct. 16, 2008

(30) Foreign Application Priority Data

Sep. 25, 2003   (DE) .............................. 103 44 392

(51) Int. Cl.
*H02P 9/00* (2006.01)
(52) U.S. Cl. .......................................... 290/44; 322/25
(58) Field of Classification Search .................. 299/44; 322/25

See application file for complete search history.

(56) References Cited

U.S. PATENT DOCUMENTS

| | | | | |
|---|---|---|---|---|
| 5,798,631 | A * | 8/1998 | Spee et al. | 322/25 |
| 6,512,966 | B2 * | 1/2003 | Lof et al. | 700/291 |
| 6,566,764 | B2 * | 5/2003 | Rebsdorf et al. | 290/44 |
| 6,856,038 | B2 * | 2/2005 | Rebsdorf et al. | 290/44 |
| 7,245,037 | B2 * | 7/2007 | Angquist et al. | 290/44 |
| 2004/0217596 | A1 * | 11/2004 | Feddersen et al. | 290/44 |
| 2004/0222642 | A1 * | 11/2004 | Siebenthaler et al. | 290/44 |
| 2005/0063115 | A1 * | 3/2005 | Nayar et al. | 361/82 |

FOREIGN PATENT DOCUMENTS

| | | |
|---|---|---|
| DE | 10019362 | 10/2001 |
| DE | 10059018 | 6/2002 |
| GB | 2330256 | 4/1999 |

OTHER PUBLICATIONS

International Search Report directed to PCT/EP2004/010816.
International Preliminary Report on Patentability directed to PCT/EP2004/010816.

* cited by examiner

*Primary Examiner*—Joseph Waks
(74) *Attorney, Agent, or Firm*—Morrison & Foerster LLP

(57) ABSTRACT

A wind turbine with a rotor and a generator driven by, the rotor generates electrical power and delivers it to a power system. A control unit controlling the operation of the plant includes a reactive-power control module. The control unit includes also a determining device for a safe minimum active power. Furthermore, and a limiting device for the reactive-power control module, wherein the reactive power is limited to such a measure that the safe minimum active power is still available, taking into consideration the available power. As a result, the total current generated, apart from the active current required for the safe operation of the plant, can be fed into the power system as reactive current as backup in the case of a voltage drop.

10 Claims, 6 Drawing Sheets

WIND POWER PLANT COMPRISING A REACTIVE POWER MODULE FOR SUPPORTING A POWER SUPPLY SYSTEM AND CORRESPONDING METHOD

The invention relates to a wind turbine with a rotor, a generator driven by it, which generates electrical power and delivers it to a power system, and a control unit which controls the operation of the wind turbine and has a reactive-power module.

Wind turbines are being used more and more. Frequently, they are not erected individually but combined to form so-called wind parks. The power station capacity provided by wind turbines is considerable. More and more, therefore, the wind turbines are no longer connected to distribution systems in the medium-voltage range but are increasingly connected directly to the transmission system in the high- and extra-high-voltage range. This entails changed demands on the characteristics of the wind turbine in the case of voltage dips. Unlike the power stations connected to distribution systems, the power stations connected to the transmission system should not be disconnected from the system in the case of a short-time voltage dip. They must act as backup to the system in the case of a voltage dip, for example due to a short circuit, and feed active power into the system. Otherwise, a critical situation could arise for the system which could lead to a drop in frequency in the system and to overloading of resources and, finally, to entire power stations being switched off. A prerequisite for feeding active power is, however, that an adequate voltage is still maintained in the power system. If the voltage in the system drops too much, the current would have to be increased to the same extent in accordance with the known relation according to which the electrical power is proportional to the product of voltage and current, so that the same active power can still be fed into the system. Since, due to the design of the power stations, the current cannot be arbitrarily increased, there is a critical limit value for the voltage; below this value, it is no longer possible to feed the required power into the system.

It is known to raise the voltage level at the junction point between power station and system by feeding in capacitive reactive current if the short circuit causing the incident is at a certain distance from the junction point. Power-system operators, therefore, give the power station operators certain preconditions with regard to feeding in reactive current in the case of voltage drops. Such a precondition can take the shape of the characteristic shown in FIG. 6. From DE-A-100 19 362, a method for regulating the active power supplied to the system is thus known which additional reactive power can be fed in as backup for the system voltage. So that the permissible total current is not exceeded, it is provided to reduce the active power delivered, if necessary.

From GB-A-2 330 256, a method for operating wind parks on weak power systems is also known in which it is provided to lower the active power delivered by the wind park in order to avoid a critical voltage rise in the case of a weak system load. How the backup is to take place in the case of a sinking system voltage is not described. Furthermore, regulation methods are known which provide a pure current limiting (DE-A-101 38 399). Additionally, further parameters such as an amount of a current to be fed in or of the power factor can be predetermined. This is primarily used for protecting limit-value transgressions with respect to the current fed in, maintaining a particular voltage or power level is not described.

From DE-C-100 59 018, finally, a method for power control of wind turbines is known which provides for the feeding-in of as constant as possible an apparent power. The input value provided is the specification of a required active power from which the regulator then sets a corresponding reactive power for keeping the apparent power constant. Providing a constant apparent power has the disadvantage that a high amount of reactive power is fed in at times with weak system load. This can lead to unwanted negative influences on the magnitude of the system voltage.

The maximum current which can be delivered by the wind turbine is restricted by operating limits of the individual components. This leads to problems in the design. If the plant is designed in such a manner that it already feeds quite a high reactive current into the power system with a slight drop in voltage, only little active current, and thus little active power, is still available. If, in contrast, the plant is designed in such a manner that it feeds only little reactive current into the power system with a voltage drop, sufficient active current will be available but the backup for the power system is only slight.

On the basis of the prior art last mentioned, the invention is based on the object of improving a wind turbine of the type initially mentioned in such a manner that it avoids the disadvantages of apparent-power regulation and, in particular, exhibits better characteristics for backing up the power system in the case of voltage drops.

The solution according to the invention is found in the features of the independent claims. Advantageous developments are the subject matter of the dependent claims.

According to the invention, it is provided in a wind turbine with a rotor, a generator driven by it, which generates electrical power and delivers it to a power system, and a control unit which controls the operation of the plant and has a reactive-power control module, that the control unit has a determining device for a safe minimum active power and a limiting device is provided which is connected to the determining device and to the reactive-power control module and interacts in such a manner that, at the most, as much reactive power is generated that the safe minimum active power is still available.

In the text which follows, some terms used will be explained:

A generator is understood to be a machine which converts mechanical energy into electrical energy. The term is not restricted to conventional direct-current machines but also includes generators for single- or multi-phase alternating current. It can be a synchronous or an asynchronous machine. As a rule, the generator also comprises an inverter but this is not mandatory. The inverter can also be constructed as a double inverter. The inverter can be constructed in various topologies such as, e.g. voltage-source DC link, current-source DC link, direct converter.

A rotor is understood to be an air screw which is constructed of one or more blades. The pitch angle of the blades is preferably adjustable.

Safe minimum active power is understood to be the active power which is required for maintaining the rotational speed of the wind turbine in such a manner that it does not depart from a permissible operating range and the mechanical loading on the drive train is kept below certain limits.

The invention is based on the idea of controlling the wind turbine in such a manner that, in the case of a voltage drop, it provides the greatest possible contribution to stabilizing the power system by determining the power requirement for its own safe continuing operation and uses the excess power as completely as possible for backing up the power system. For this purpose, the invention provides that the minimum active power required for safe operation is determined by means of a determining device. According to the invention, the control system is designed in such a manner that at least this active power is generated. This ensures that the wind turbine remains within its operating limits, especially that the rotational speed of the rotor does not depart from the permissible operating range. This is because if the safe minimum active power were to be no longer generated, there would be the risk that the rotor, relieved as a result, increases its rotational speed beyond the operating range which could cause damage to the wind turbine. The reactive-power control module is designed in such a manner that the (vectorial) difference with respect to the available apparent power can be delivered as reactive power as backup into the power system. In this manner, the invention achieves that a large amount of reactive power can be rapidly delivered as backup for the power system. Due to the invention, the available apparent power is maximally utilized for backing up the power system without attempting to keep the apparent power constant, which could result in too high a reactive-power feed-in with frequently negative consequences for the quality of the system voltage in the case of a weak system load. In the case of an apparent-power regulation as known from the prior art it cannot be ensured, due to the principle involved, that the active power does not drop below a certain amount. It is thus not possible to achieve the maintenance of a safe minimum active power by means of apparent-power regulation. The dilemma, which exists in the prior art, to find a middle course between a flat characteristic with little power system backup or a steep characteristic with the risk that sufficient active power for a safe operation of the plant is no longer generated and in doing so, to give away power capability in order to have sufficient safety margin, is overcome by the invention. In particular, current plant, site and environmental conditions can be taken into consideration individually in order to increase the backup effect.

The safe minimum active power can be determined in different ways. It can be provided to determine the power needed for this purpose directly or to determine the required torque (safe minimum torque). The latter is directly linked to the safe minimum active power via the angular velocity (rotational speed). The determining device preferably has a speed reserve module. This module is designed for determining the current rotational speed of the rotor and to compare it with the limits of the speed operating range. The smaller the gap, the more active power must be generated in order to prevent the operating range from being exceeded. There are preferably other modules. To achieve a good dynamic characteristic, a rotational acceleration module can be additionally provided. This detects the change in rotational speed and determines in this manner whether, starting with the current rotational speed, the speed operating range is threatened to be exceeded soon, or not. Depending on this, the safe minimum active power necessary for maintaining a stable operation is increased or decreased. Thus, the required safe operating power can even be zero at certain operating points. As further improvement, a module for the blade angle of the rotor can be correspondingly provided.

The fast provision of reactive power for backing up the power system and the associated reduction in active power generated through the safe minimum active power represents a shock load which can lead to severe mechanical loading. This applies, in particular, if a gearbox is arranged in the drive train between rotor and generator. Such a shock load can excite vibrations of the drive train. To damp these, a shock vibration damping module is preferably provided. It is constructed for intervening in electrical and possibly also mechanical parameters of the wind turbine in such a manner that the natural frequencies of the drive train and of the blades of the rotor, excited by the shock load, are damped. To provide for a response which is fast enough, the time constant of the shock vibration damping module is advantageously distinctly smaller than that of any normal-operation vibration damper which may be present and is preferably less than $\frac{1}{8}$ s. This makes it possible to compensate for abrupt changes in a better way than is the case with the vibration damping for normal operation, which is designed for damping periodic events. So that the power system backup is not unnecessarily impaired, the shock vibration damping module is suitably constructed in such a manner that it only uses a limited part of the available active power for damping vibrations.

Preferably, a transgression module interacting with the aforementioned modules is provided which allows predetermined limit values to be exceeded in dependence on time. For this purpose, the transgression module has, in particular, a dynamic limit value and a static limit value. It is designed in such a manner that the dynamic limit value is not allowed to be exceeded for a certain time and thereafter the (lower) static limit value is not allowed to be exceeded. Thus, the transgression module generates time-dependent limit values. This makes it possible to exceed the limit values for a short time for improving the operating characteristic of the wind turbine. This is of particular advantage with respect to the shock vibration damping module since it can then damp the vibrations occurring to the shock load rapidly by utilizing the higher dynamic limit values for a short time.

In a preferred embodiment, the reactive-power control module is constructed as state controller. This has the advantage that a multidimensional system, which is typically the case in a wind turbine, can be controlled in a better way. This is a considerable advantage especially with the increasing complexity of the plants. A state controller also has the advantage that nonlinear and time-variable systems or system components can be taken into consideration in a better way. Accordingly, the determining device preferably also has a state observer. By this means, the accuracy in the determination of the safe minimum active power can be improved especially if the wind turbine has nonlinearities and time variants in its system.

The invention also relates to a corresponding method for controlling the operation of a wind turbine on a power system with a generator, wherein reactive power is fed into the power system in dependence on a voltage drop in the power system, wherein, according to the invention, a safe minimum active power required for safe continued operation is determined and the reactive power generated is limited to such a, preferably greatest-possible value that the safe minimum active power is still generated. The method according to the invention ensures that the reactive power fed in as backup reaches as high a value as possible until it is limited. The above applies correspondingly with regard to further details and advantageous developments.

In the text which follows, the invention is explained with reference to the attached drawing, in which an advantageous exemplary embodiment of the invention is shown and in which.

Figure 1:
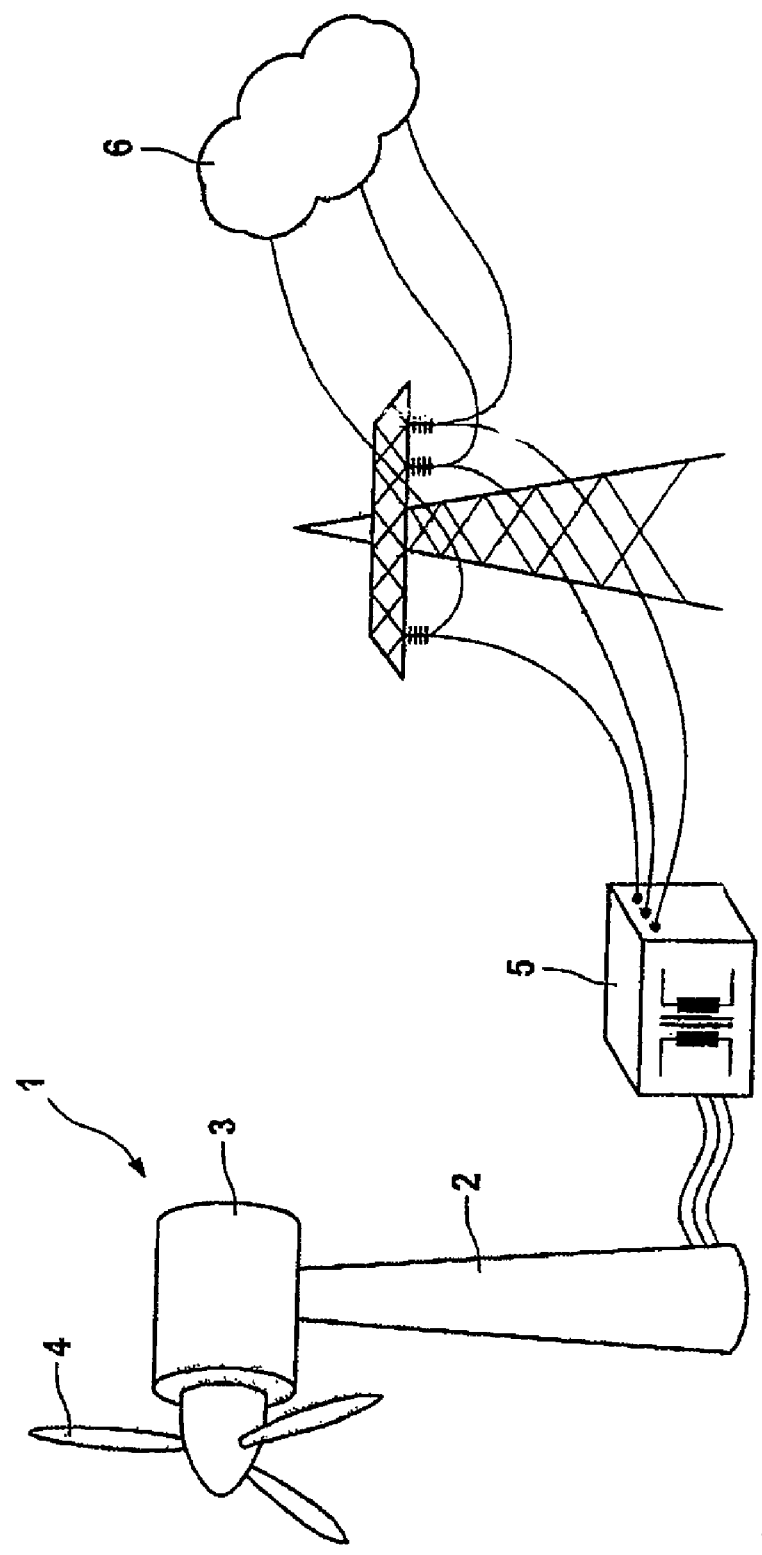
FIG. 1 shows a diagrammatic view of a wind turbine according to the invention, connected to a power system.
Figure 2:
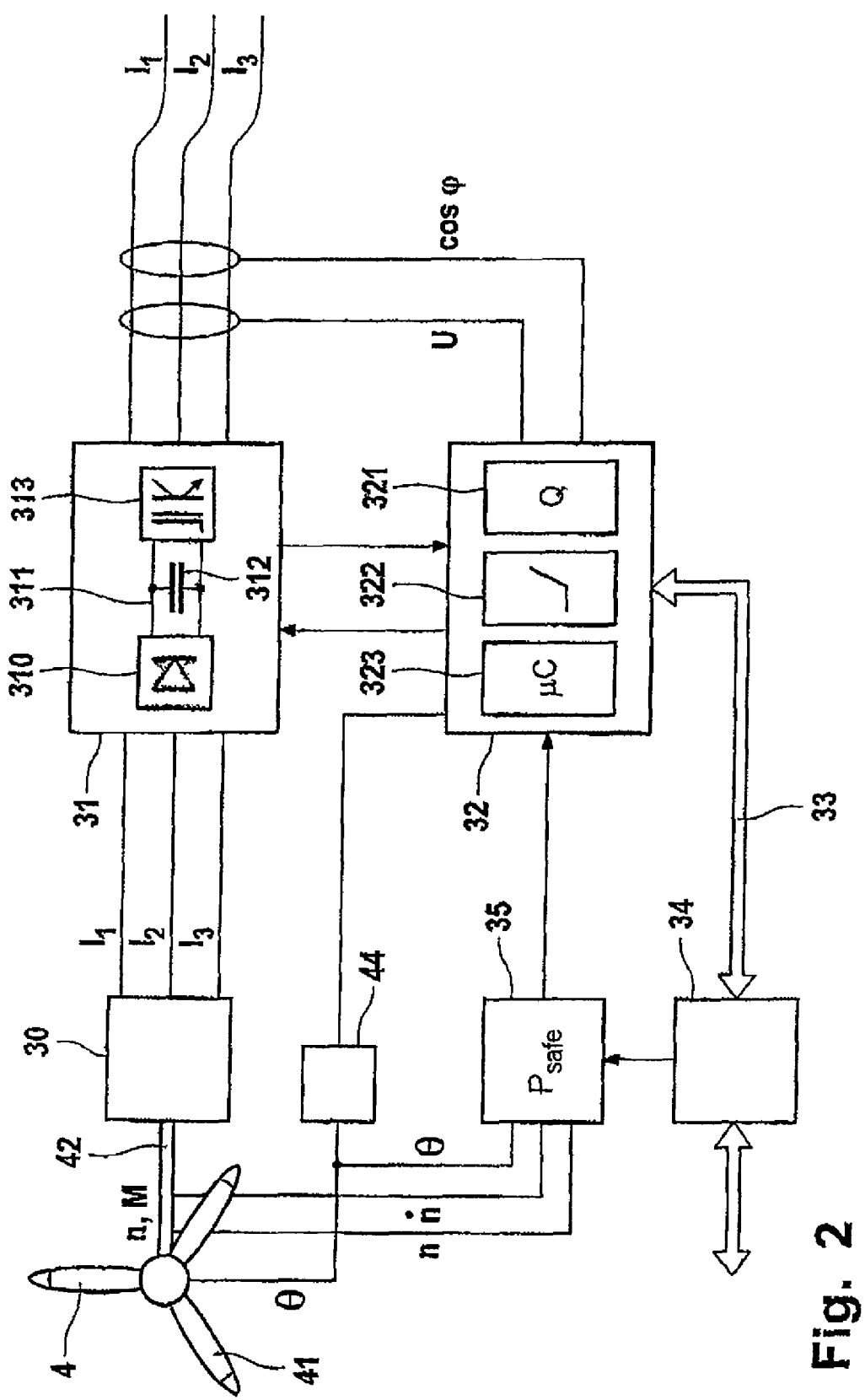
FIG. 2 shows a diagrammatic view of a control unit of the wind turbine according to the invention.

A wind turbine according to the invention, the totality of which is designated by the reference number 1, comprises a tower 2 with a nacelle 3 arranged at its top end, with a rotor 4. The wind turbine 1 is connected via a connecting device 5 to a power system 6. The power system 6 is a high- or extra-high-voltage system used for the long-distance transmission of electrical energy. The connecting device 5 has suitable transformation means for raising the electrical power supplied by the wind turbine 1 to a voltage level suitable for feeding into the power system 6.

The rotor 4 is supported rotationally movably at the front end of the nacelle 3. The rotor 4 has three rotor blades 41 arranged on a central hub 40. The pitch angle of the rotor blades 41 can be changed via a pitch-adjuster 44. In the nacelle, an asynchronous machine 30, an inverter unit 31 and a control unit 32, among others, are arranged as main assemblies. This arrangement is only exemplary; naturally, a dual-feed asynchronous generator, an externally or permanently excited synchronous generator can also be used in alternative embodiments. The rotor 4 drives the asynchronous machine 30 directly or indirectly via a gearbox (not shown) via a drive shaft 42. It converts the mechanical power supplied by the rotor 4 into electrical power which is supplied to the inverter unit 31 as three-phase current. The inverter unit 31 has at its input end facing the asynchronous machine 30 a passive or active inverter 310. From this, the electrical power is conducted as direct voltage via a DC link circuit 311 with a storage capacitor 312 to an inverter 313, where the electrical power is converted into a three-phase alternating current. The components used for the inverter are, in particular, diodes, thyristors, IGBTs, IGSTs or GTO. It can also be constructed with dual feed. The operation of the inverter unit 31 is controlled by the control unit 32. It determines, via suitable control lines (only shown partially) the voltage, the current and the distribution of the delivered power into active and reactive power. The electrical power delivered as three-phase current by the inverter unit 31 is supplied to the power system 6 via the connecting device 5. The voltage and the phase angle of the electrical power delivered is measured and fed back to the control device 32. In the alternative generator types, the converter is suitably adapted.

The control device 32 comprises a sequence control processor 323, a reactive-power control module 321 and a limiting device 322. The reactive-power control module 321 is used for controlling the reactive power delivered to the system by the inverter 31. The limiting device 322 ensures that the value output by the reactive-power control module 321 for the reactive power does not exceed certain limits. The control unit 32 is optionally connected to a remote data transmission unit 34 via a data bus 33. It is constructed for receiving inputs and parameter changes from a remote central station and to convey these to the control unit 32 and, on the other hand, for conveying information about the operation of the wind turbine to the remote central station.

Figure 3:
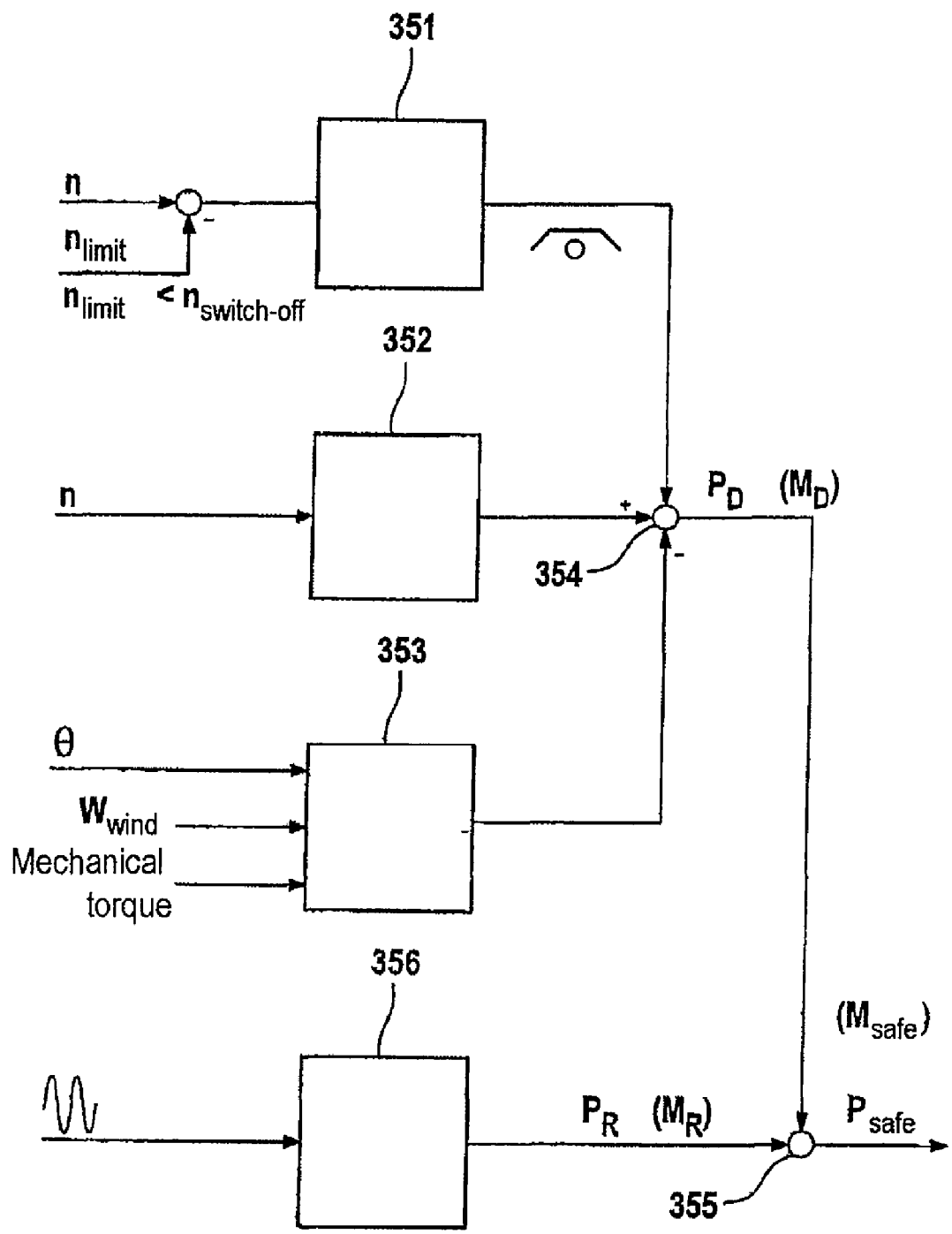
FIG. 3 shows a diagrammatic view of a determining device.

According to the invention, a determining device 35 for the safe minimum active power is provided. The determining device for the safe minimum active power is supplied on a first branch with the rotational speed (n), its deviation with respect to time and the blade angle as input variables. FIG. 3 shows the configuration of the determining device for safe minimum active power in greater detail. The rotational speed (n) is evaluated with respect to a limit value ($n_{limit}$) and conducted to a summation element 354 via a first processing element 351. Its output signal is limited in such a manner that it is at least zero. The deviation of the rotational speed with respect to time is conducted with inverted sign to the summation element 354 via a second processing element 352. In addition, the blade angle and optionally the wind speed and the torque measured at the drive shaft 42 or the gearbox (not shown) is conducted with inverted sign to summation element 354 via a third processing element 353. The sum formed from these is a measure of the minimum active power required for maintaining stable operation. It is supplied as a first summand to a second summation element 355. On a second branch, the active power required for damping shock vibrations is determined. This is done by means of a fourth processing element 356. The active power for damping vibrations, thus determined, is supplied as second summand to the second summation element 355. It should be pointed out that the second branch relating to the shock vibration damping is not absolutely necessary. Summing together provides the safe minimum active power at the output of the second summation element 355. The safe minimum active power is conveyed to the control unit 32 as output signal of the determining device 35. According to the transformation P=M*ω, the representation can also be by means of torques instead of active power.

Figure 4:
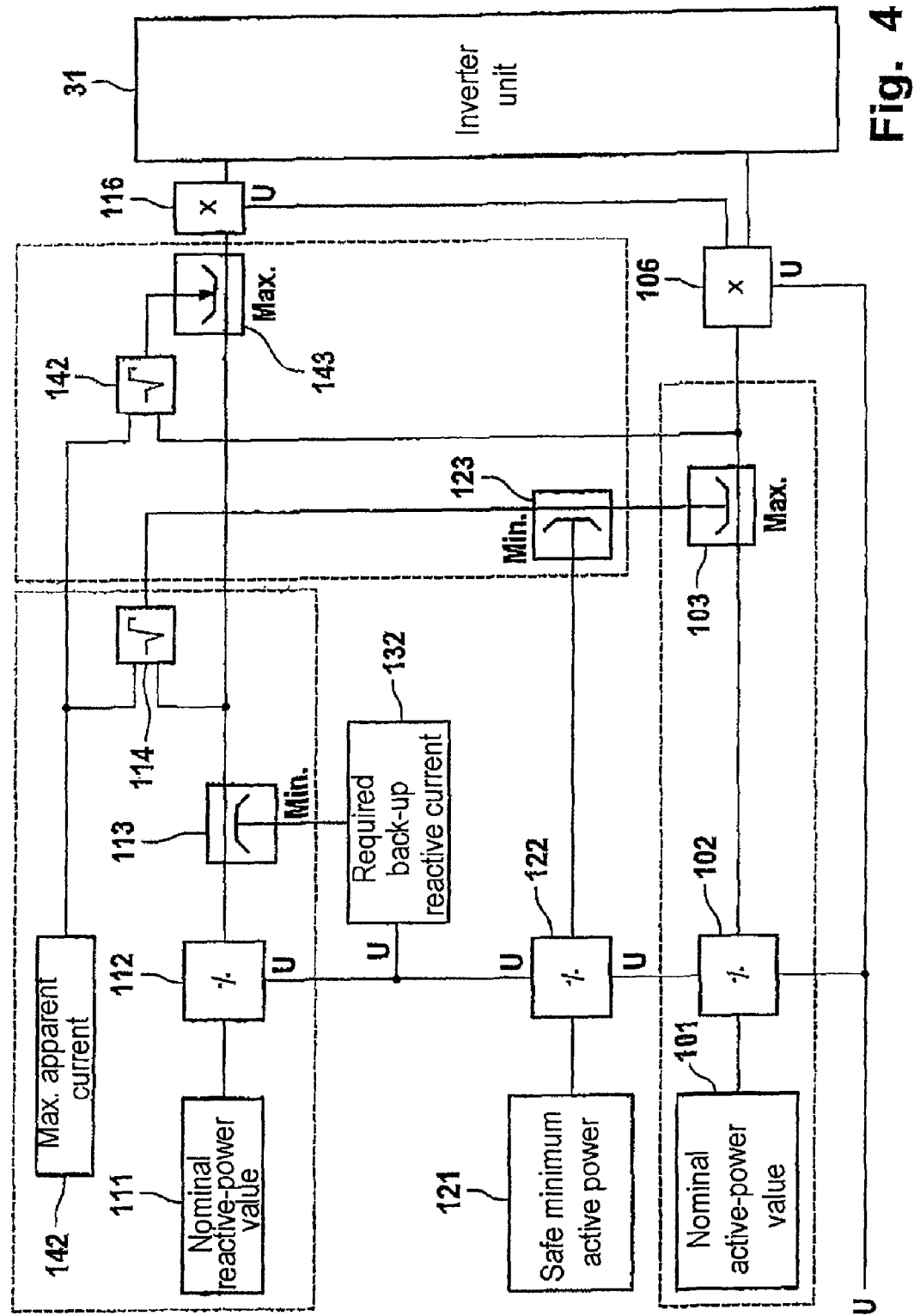
FIG. 4 shows a block diagram of the wind turbine according to the invention.

In the text which follows, the operation in the case of a system incident with a drop in system voltage will be described with reference to FIG. 4. A sequence control unit, not shown, of the wind turbine predetermines a nominal active-power value (step 101) and a nominal reactive-power value (111). From this, the nominal value for the active current (step 102) and for the reactive current (step 112) can be calculated by division by the system voltage, more precisely by the factor √3 of the linked voltage in the case of a three-phase system. By means of the determining device (35), the safe minimum active power obtained at the present operating point is determined (step 121). From this, the required safe minimum active current is calculated (step 122), also by division by the system voltage.

Figure 6:
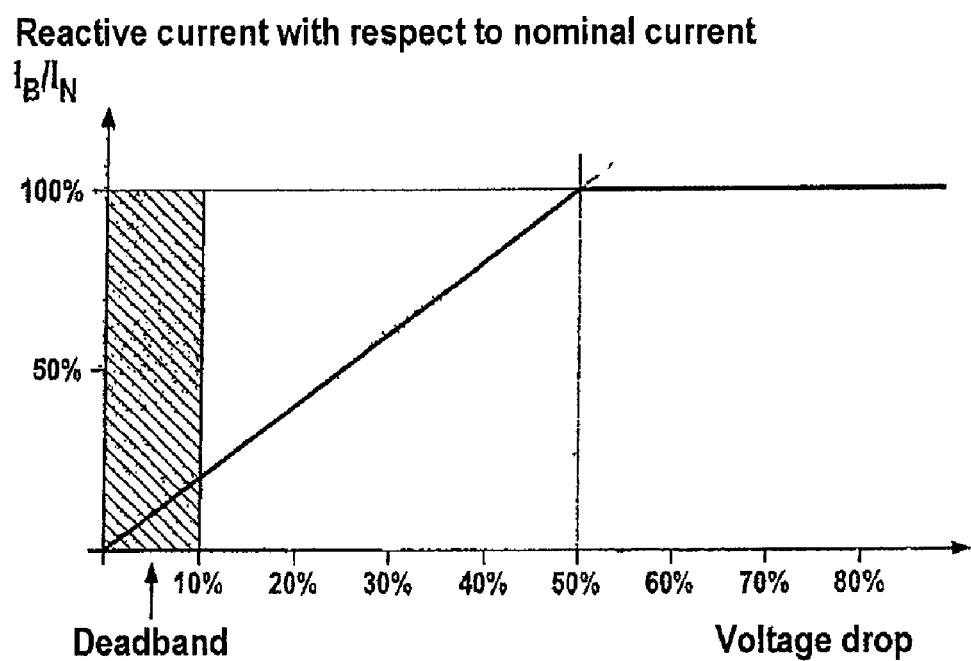
FIG. 6 shows a characteristic of reactive-current feed-in over voltage.

If then a system incident occurs which leads to a drop in the system voltage, reactive current must be fed in by the wind turbine 1 as backup for the power system 6. The magnitude of the reactive current to be fed in is dimensioned as specified by the system operator. An example of this is given in FIG. 6. There is a simple relationship between the voltage drop in the power system and the reactive current to be fed in. Naturally, this relationship can also be more complex, e.g. in the form of a voltage regulation, known per se in the power station field, in which the voltage in the system is to be regulated with the aid of the reactive current, or that the reactive current to be delivered by the wind turbine 1 is transmitted directly by the system operator via corresponding remote data transmission means. This determination of the required back-up reactive current is effected in step 132. This back-up reactive current represents the lower limit of the reactive current; if the nominal value calculated in step 112 is lower, it is raised via this limitation to the minimum value (step 113). It is also possible to specify an additionally required back-up reactive current by means of a similar characteristic (not shown). From the nominal reactive-current value thus corrected, a maximum permissible active current is calculated on the basis of the maximum apparent current (142) (step 114). This maximum permissible active current is limited towards the bottom by the safe minimum active current determined in step 122 (step 123). The resultant active current which is at least as high as the safe minimum active current represents an upper limit for the nominal active-current value calculated in step 102 (step 103). From this so-called limited nominal active-current value, the limited nominal active-power value is calculated by multiplication by the system voltage (step 106); accordingly, a limited nominal reactive-power value is calculated (step 116) from the corrected nominal reactive-current value by multiplication by the system voltage. This value is supplied to the inverter unit 31. This ensures safe operation of the wind turbine 1.

Figure 5:
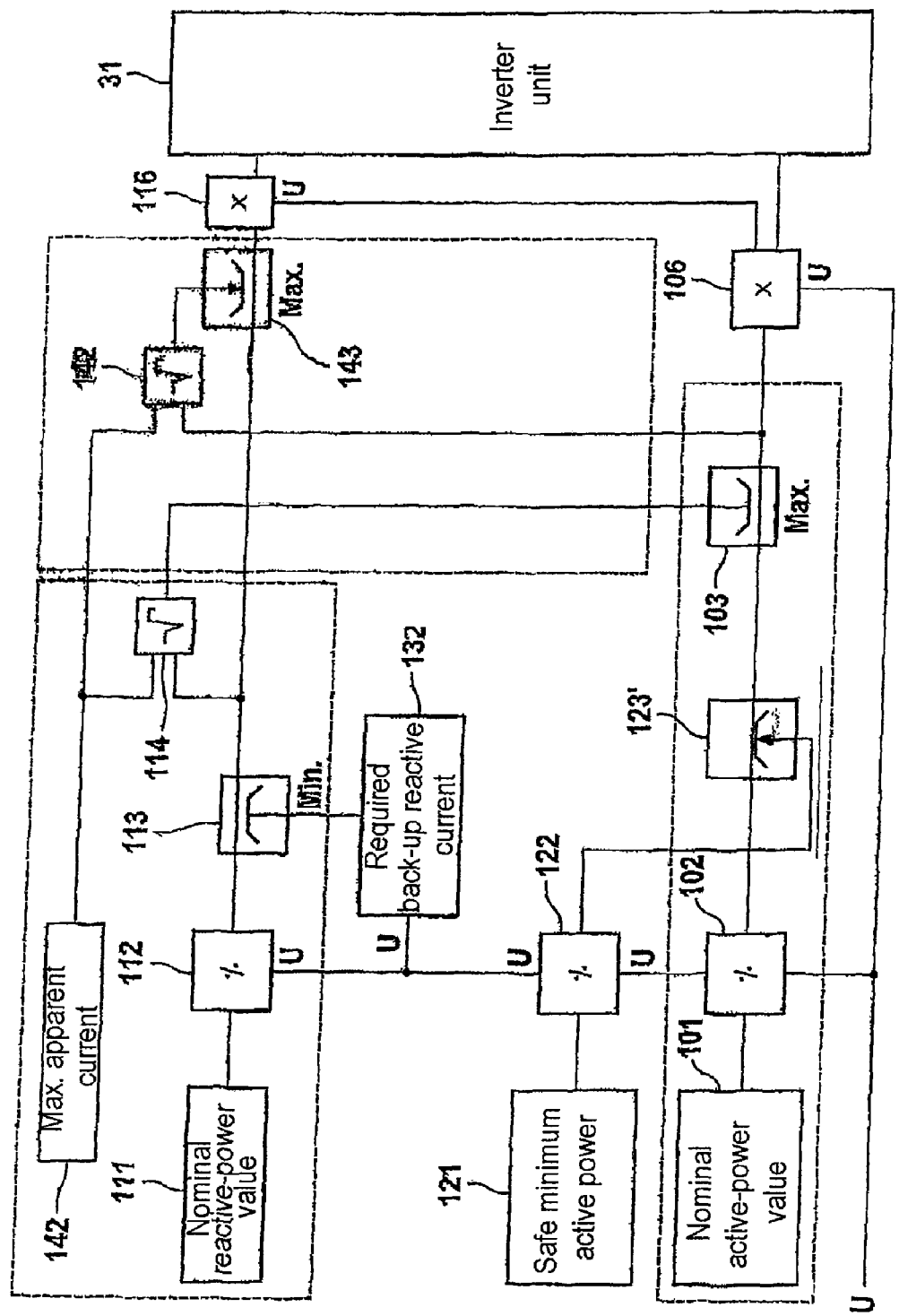
FIG. 5 shows a variant of the block diagram of FIG. 4.

In FIG. 5, a variant is shown in which the value is limited to at least the safe minimum value in step 123'.

On the basis of this limited nominal active-current value, in turn, a maximum permissible reactive current is calculated in a calculation step 142, taking into consideration the maximum apparent current (step 142). This represents the upper limit for the reactive current which the wind turbine (1) can feed into the power system as backup. From this, the limited nominal reactive-power value is calculated by multiplication by the system voltage (step 116). This value is also supplied to the inverter unit 31.

For example, the available amount of reactive power in dependence on the generator speed for a wind turbine with double-fed asynchronous machine (DASM) can be described in good approximation as $$|Q| = |Q_{Stator}| + |Q_{Rotor}| = \sqrt{(S_{Stator})^2 - (P_{Stator})^2} + \sqrt{(S_{Rotor})^2 - (sP_{Stator})^2}$$

with $$s = \frac{n_{sync} - n}{n_{sync}}$$

$S_{Stator}$ available apparent power, stator branch
$S_{Rotor}$ available apparent power, rotor branch (i.e. particularly converter at system end)
$P_{Stator}$ active-power contribution by the stator branch
$Q_{Stator}$ reactive-power contribution by the stator branch
$Q_{Rotor}$ reactive-power contribution by the rotor branch
S slip
$n_{sync}$ synchronous speed
n generator speed Using these limited nominal active-power values and limited nominal reactive-power values, the inverter unit 31 sets the inverter 313 in such a manner that the corresponding active and reactive powers are delivered to the power system 6 via the connecting device 5. If the inverter unit has, instead of the full-wave rectifier 310 at the input end, a second inverter, the corresponding nominal quantities are preferably supplied to the latter. The DC link circuit with the charge storage 312 is then additionally available as energy store for buffering purposes.

If the wind turbine does not have an inverter unit 31 at all but the required active and reactive power is effected directly via corresponding adjustment of the generator 30, the corresponding nominal quantities are directly supplied at the generator 30.

The invention claimed is:

1. A wind turbine with a rotor, a generator driven by it, which generates electrical power and delivers it to a power system, and a control unit which controls the operation of the wind turbine and has a reactive-power control module, wherein the control unit has a determining device for a safe minimum active power and a limiting device is provided which is connected to the determining device and to the reactive-power control module and interacts in such a manner that, at the most, as much reactive power is generated that the safe minimum active power is still available.

2. The wind turbine as claimed in claim 1, wherein the determining device has a speed reserve module.

3. The wind turbine as claimed in claim 2, wherein the determining device has a rotational acceleration module and/or a blade pitch module.

4. The wind turbine as claimed in one of claims 2 or 3, wherein the determining device has a shock vibration damping module.

5. The wind turbine as claimed in claim 4, wherein the time constant of the shock vibration damping module is less than ⅛ of a vibration damper for the normal operation.

6. The wind turbine as claimed in claim 1, 2 or 3, wherein a limit-value transgression module is provided for at least one of the modules.

7. The wind turbine as claimed in claim 6, wherein the limit-value transgression module comprises a dynamic limit value and a static limit value.

8. The wind turbine as claimed in claim 1, 2, or 3 wherein the reactive-power control module is constructed as state controller.

9. The wind turbine as claimed in claim 1, 2, or 3 wherein the determining device has a state observer.

10. A method for controlling the operation of a wind turbine on a power system with a generator, wherein reactive power or reactive current, respectively, is fed into the power system in dependence on a voltage drop in the power system, including determining of a safe minimum active power required for safe continued operation and limiting the reactive power to such a value that at least the safe minimum active power is still generated.

* * * * *